UNITED STATES PATENT OFFICE.

KNUD ERSLEV, OF NIJMEGEN, NETHERLANDS.

PROCESS FOR THE MANUFACTURE OF ARTIFICIAL MILK.

1,297,668.     Specification of Letters Patent.     Patented Mar. 18, 1919.

No Drawing.     Application filed January 3, 1919. Serial No. 269,527.

*To all whom it may concern:*

Be it known that I, KNUD ERSLEV, a subject of the King of Denmark, and residing at 268 Groesbeekscheweg, Nijmegen, Netherlands, have invented certain new and useful Improvements in Processes for the Manufacture of Artificial Milk, of which the following is a specification.

Efforts have already been made to prepare artificial milk from vegetable products containing proteids, and several patents that have been taken out for the different procedures. In the prior art, seeds or other parts of various plants have been described as the starting material, the plants most generally referred to being soya beans, peanuts, legumes especially those which do not contain too great a percentage of starch, cocoa nuts, seeds of pine trees, sesame seeds, emulsin of almonds, glutin and various others. In some of the prior processes more or less of the fat contained in the vegetable matter (but never all of this fat) is extracted, this being effected for example, by treatment with alkaline solution, sometimes by ordinary warm water, or equivalent methods. This treatment, especially the treatment with weak alkaline solutions may produce an emulsion containing the albumin or other proteid materials, to which may be added carbo-hydrates, inorganic salts, or citric acid, to produce products approaching the composition of real milk. Soya beans have been proposed as the starting material of such processes, but the product invariably possesses an objectionable flavor. This flavor has been ascribed to the fat and efforts have been made to remove the flavor before the treatment of the soya beans with warm water, or with warm alkaline solution, among the methods tried being the preliminary removal of the fat from the beans, by suitable extracting solvents, and also the separation of the fat from the proteid matter after the solution of the latter is effected, this being carried out in centrifugal machines of the milk separator type. The removal of the fat was inefficient by the methods heretofore suggested, and it was accordingly suggested to employ sesame oil by emulsifying the same with the albuminous solution produced by treating soya bean with diluted alkali solution (see British Patent 24572 of 1913).

These methods do not accomplish the result of avoiding unpleasant flavor in the product. The milk produced therefrom (for example from the beans or seeds of the plants above mentioned) retains an unpleasant or strong flavor due to the very incomplete removing of the flavoring ingredients.

I have found that the unpleasant flavor is due to the insufficient removal of fats and fatty acids from the product under treatment, and that the objectionable flavors are largely produced by the presence of products dissolved in the fat, which products themselves, such as esters, aldehydes, and ketones, and not the fats, possess disagreeable odors.

I have further found that these substances can be removed from the soya bean meal or similar material, together with the fat, by extraction with fat solvents, such as benzin or benzene. I have further found that there are also certain bitter principles (as distinguished from the substances producing the unpleasant or "strong" flavors) present in the vegetable material, which are soluble in alcohol, which also produce an undesired after-taste in the milk, and that there are other alcohol-soluble extractives in the vegetable matter, which can form useful constituents of the artificial milk.

Now based upon the above observations I have discovered a process by which it is possible to produce, from the classes of vegetable material referred to, an artificial milk which not only can be used directly as milk, but which can also be used for churning up with other fatty material, for the production of butter substitute, and the products are free from objectionable flavor. It has already been proposed to produce butter substitute, by churning up vegetable fats with whole or skimmed milk, for converting such fat into the form of fine particles or globules and the milk produced in accordance with the present invention may be used as a substitute for such milk. In the manufacture of such butter substitutes, the "after-taste" is of particular importance.

As raw material for the manufacture of milk in accordance with the present process any vegetable material can be used in which protein is present in a sufficient quantity. It is advantageous also if the substance also contains a suitable amount of sugar, and also some lecithin. The raw material may also contain a sufficient amount of fat, or this latter can be added from an extraneous source. The materials above specifically mentioned are all suitable as raw materials of the present process.

The process involves four essential steps or sub-processes, which may be described as follows:

(1) The material under treatment, for example soya bean flour, is first treated with a fat solvent, in such a manner as to completely remove the fat content. The preferred extracting medium is bezin or benzol, which solvent is distilled off and may be re-used. The fat so extracted is refined if the same is to enter into the final product, such refining including the complete removal of the principles above referred to, which produce the disagreeable flavor. The refining of the fat may be made easier, if the raw material before extraction is completely dried, for example by heating to a temperature at which enzyms become inactive. Such heating renders coloring matter, mucilaginous substances and soluble albumins, insoluble in the fat solvent used. The refined fat if suitable for the purpose, after being hardened if desired, may be employed for the manufacture of butter substitutes or cooking fats.

(2) The residue from the fat extraction is extracted with alcohol, the alcohol distilled for re-use, and from the residue the bitter principles are removed in a suitable manner depending upon the particular starting material used. The residue of the extract, after the removal of the bitter principles usually consists largely of lecithin, sugars, tasteless gums, soluble albumins and other constituents depending upon the particular starting material.

(3) The residue from the alcohol extraction, that is to say the part of the vegetable material which has not been dissolved either in the fat solvent or in the alcohol, is then treated with a weak alkaline solution, by which operation protein is dissolved.

(4) To the solution of protein obtained in the third step is added the purified alcohol extract, and a suitable amount of a fatty material, for example that produced in the first step, and the mixture thereby produced is emulsified to the condition of milk. This milk constitutes one of the products of the process, and the emulsification may be performed either in the sweet condition or after acidification if desired. It is of course understood that no fatty material should be added which contains materials capable of giving the product any undesired flavor, or of giving any after-taste. There may be added other materials if desired, to bring the composition as closely as possible up to that of pure animal milk. If coloring matter is present, the material will of course show this, but this is of no importance in the manufacture of butter substitute, whereas in milk for consumption as such, color is only an imaginary disadvantage. With some starting materials substantially colorless or even absolutely colorless artificial milk will be produced. The color is largely produced by dark colored sugars, and if desired the alcoholic extract in the second step of the process may be bleached in an appropriate manner.

For the preparation of butter substitute from this artificial milk it is only necessary to emulsify the same with the required amount of fat, for example by churning, there being added suitable quantities of coloring matters, salt if desired, or other flavoring matter if desired.

The material advantage of the process is that factories can often produce the artificial milk and also the required amount of fat for making butter substitute, from the same initial material.

The residue of the third step is suitable for use as cattle food.

The new process as above described differs from the known processes particularly in that prior to the solution of the protein, the material is subjected to two extractions, the first of which removes completely the fat from the raw material, as well as the fat-soluble substances which produce disagreeable flavors, and the second of which removes alcohol-soluble matter, and both of these extracts after suitable purification can be employed in the final product.

In the above description, it is understood that the term "fat" wherever used, includes also oils.

I claim:

1. A process of making artificial milk which comprises successively subjecting a vegetable material containing protein, fatty materials and alcohol-soluble material, to extraction with a fat-extracting solvent and with alcohol, and subjecting the remainder after said extraction to treatment with an alkaline liquid to dissolve protein; purifying the alcohol-extract to remove bitter substances therefrom and adding such purified extract to the liquid resulting from the protein-extraction and mixing fatty material therewith.

2. In the process of preparing artificial milk, the improvement which comprises successively subjecting a vegetable material containing fats, lecithin, sugars, and protein, in a finely divided state, to two extractions, first with a fat-extracting solvent in such way that the fat and fat-soluble substances capable of producing disagreeable flavors are completely removed therefrom, and second with alcohol to dissolve lecithin, sugars, and bitter principles; thereafter treating the residue from said two extractions, with an alkaline liquid to dissolve the protein; purifying the alcohol-extract to remove bitter principles therefrom and adding the so purified alcohol-extract to the alkaline extract.

3. A process for preparing artificial milk which comprises successively subjecting a comminuted vegetable material containing protein, fatty substances, sugars and lecithin, to two successive extractions, viz. firstly with a fat-extracting solvent in such a way that substantially all of the fat is removed, and secondly with a solvent of lecithin and sugars; thereafter extracting the residue with an alkaline liquid to dissolve protein, and to produce an alkaline solution containing protein derivatives; purifying the alcohol-extract to remove bitter principles therefrom, and adding the residue thereof, containing lecithin and sugars to said alkaline solution; purifying at least a part of the fatty material to remove substances having disagreeable flavors, and adding at least a part of the so purified fat to the mixture of alkaline liquid and purified alcohol-extract.

4. A process of producing an artificial milk material which comprises treating soya bean material, first with a fat solvent to separate oily material having a disagreeable flavor, then treating the residue with alcohol to separate materials including bitter principles, then treating the residue with an alkaline solution to dissolve proteid matter; freeing the alcohol-extracted matter from bitter principles and adding the remainder thereof to the alkaline extract; freeing the oily material from those of its constituents which are capable of producing a disagreeable flavor, and emulsifying at least a part thereof with the alkaline extract and the purified alcohol-extract.

5. A process of producing artificial milk which comprises removing substantially all of the fat and alcohol-soluble constituents from vegetable material containing protein, treating the residue of such protein-bearing material with an alkaline solution, to produce an alkaline solution of protein derivatives, and emulsifying with said alkaline solution materials free from bitter tastes and from disagreeable flavors, containing lecithin and fat.

6. In the manufacture of artificial milk from comminuted oil bearing seed material containing protein, the improvement which comprises successively extracting such material with (a) a fat solvent, (b) alcohol and (c) an alkaline solution, to produce, in said last mentioned step a protein extract capable of emulsification with oily material.

In testimony whereof I affix my signature.

KNUD ERSLEV.